Fenton M. Wood
Alfred E. Crouch
INVENTORS
BY Arnold and Roylance
ATTORNEY

Fenton M. Wood
Alfred E. Crouch
INVENTORS

BY Arnold and Roylance
ATTORNEY

Fenton M. Wood
Alfred E. Crouch
INVENTORS
BY Arnold and Roylance
ATTORNEY

Fenton M. Wood
Alfred E. Crouch
INVENTORS

BY Arnold and Roylance

ATTORNEY 3,341,771
MAGNETIC FLAW DETECTOR UTILIZING A MAGNETIC RECORDING MEDIUM TO DETECT THE MAGNETIC FLAW PATTERN

Alfred E. Crouch and Fenton M. Wood, Houston, Tex., assignors, by mesne assignments, to American Machine & Foundry Company Continuation of application Ser. No. 85,100, Jan. 26, 1961. This application Jan. 24, 1967, Ser. No. 611,467
14 Claims. (Cl. 324—37)

ABSTRACT OF THE DISCLOSURE

A method and apparatus for detecting flaws in ferromagnetic members by magnetizing the member while at the same time laying a magnetizable medium progressively upon the magnetized member to accept a flux pattern indicative of flaws, progressively removing the magnetizable medium from the member and means for sensing and converting the flux pattern into an electrical signal indicative of flaws.

This is a continuation of application Ser. No. 85,100, filed January 26, 1961.

This invention relates to a means and method for detecting flaws in a ferromagnetic member and is particularly concerned with the detection of flaws in areas of gross wall discontinuity, such as weld lines, in ferromagnetic members of tubular configuration.

Presently, there are several methods for detecting flaws in such members including, the magnetic particle method, the search coil method, the eddy current method, the X-ray method and the ultrasonic method.

The magnetic particle method comprises, in general, the steps of magnetizing the member to be inspected, application of magnetic powder thereto, and visual observation of the resulting powder pattern which, when done by one skilled in such observation will permit him to translate deviations in the normal pattern into an opinion of the nature and extent of the flaw producing such deviation. While this method has many valuable applications, it does have several drawbacks among which are: Dependence upon visual interpretation, slowness of the procedure, and failure of the procedure to produce pattern deviations in response to relatively wide flaws such as changes in wall thickness, relatively wide pits or grooves and changes in hardness and/or structure.

The search coil method involves the steps of, magnetizing the member to be inspected, passing a search coil over the member, and recording and interpreting the voltages induced in the search coil in response to flux leakage and/or variations in flux density. While this method has become very important commercially because of its excellent sensitivity, resolution and speed, it has certain shortcomings which make it impractical for certain applications. For example, when changes in cross-section or surface irregularities are encountered, it is necessary for the search coil to travel very close to the surface of the member being inspected in order that the flaw induce sufficient voltage in the search coil to produce a corresponding distinguishable signal. Thus, if a gross discontinuity, common in electric or submersion welded joints or seams, causes the search carriage to rise, with respect to the member being tested, it will reduce the sensitivity of the coil to the flux normally produced by a crack and the crack may go unnoticed. Moreover, any sharp change in the speed at which the search coil passes over a gross discontinuity will cause the normal pattern of the voltage generated by such a discontinuity to become distorted and thereby unrecognizable or mistaken for a crack or the like.

The eddy current method involves the sensing and interpretation of changes in the characteristics of an alternating current in a coil as the coil is passed over the ferromagnetic member being inspected. While this method has some application, it also has many limitations. For example, in the inspection of drill pipe which varies relatively widely in resistivity and magnetic permeability, and has irregular surfaces as well as variations in dimensions, it is most difficult and often impossible to distinguish the signals produced in response to these harmless irregularities from signals produced in response to a flaw.

The X-ray method, which of course, involves the photographic technique of directing X-ray radiation into the member to be tested and recording the radiation passing therethrough on a photographic plate positioned behind the member, and subsequent interpretation of the picture obtained in the plate, while offering many advantages is nonetheless far too expensive to admit a wide commercial application. Further, it offers only a very slow production rate.

Ultrasonic inspection is likewise relatively expensive and of limited commercial application particularly where, as in the case of drill pipe inspection and the like, even the most carefully controlled conditions result in poor and intermittent acoustical contact and lack of resolution of surface and near surface defects.

Accordingly, it is an important object of this invention to provide a means and method for detecting flaws in ferromagnetic members, which means and method will be inexpensive, highly sensitive and reliable and will provide a high-speed system adaptable to wide commercial application.

It is another object of this invention to provide means and method of the type described capable of producing a high signal-to-noise ratio.

Still another object of this invention is to provide means and method of the type described which will not reflect changes of speed or vibration resulting from relative movement between the member being inspected and the apparatus employed therefor.

A further object of this invention is to provide means and method of the type described which will be insensitive to nonflaw discontinuities such as deviation in cross-sectional area.

There are, of course, other objects and advantages of this invention, many of which will be made apparent by the following detailed description of two embodiments thereof given in conjunction with the accompanying drawings wherein.

Figures 1, 2, 3, 4, 5:
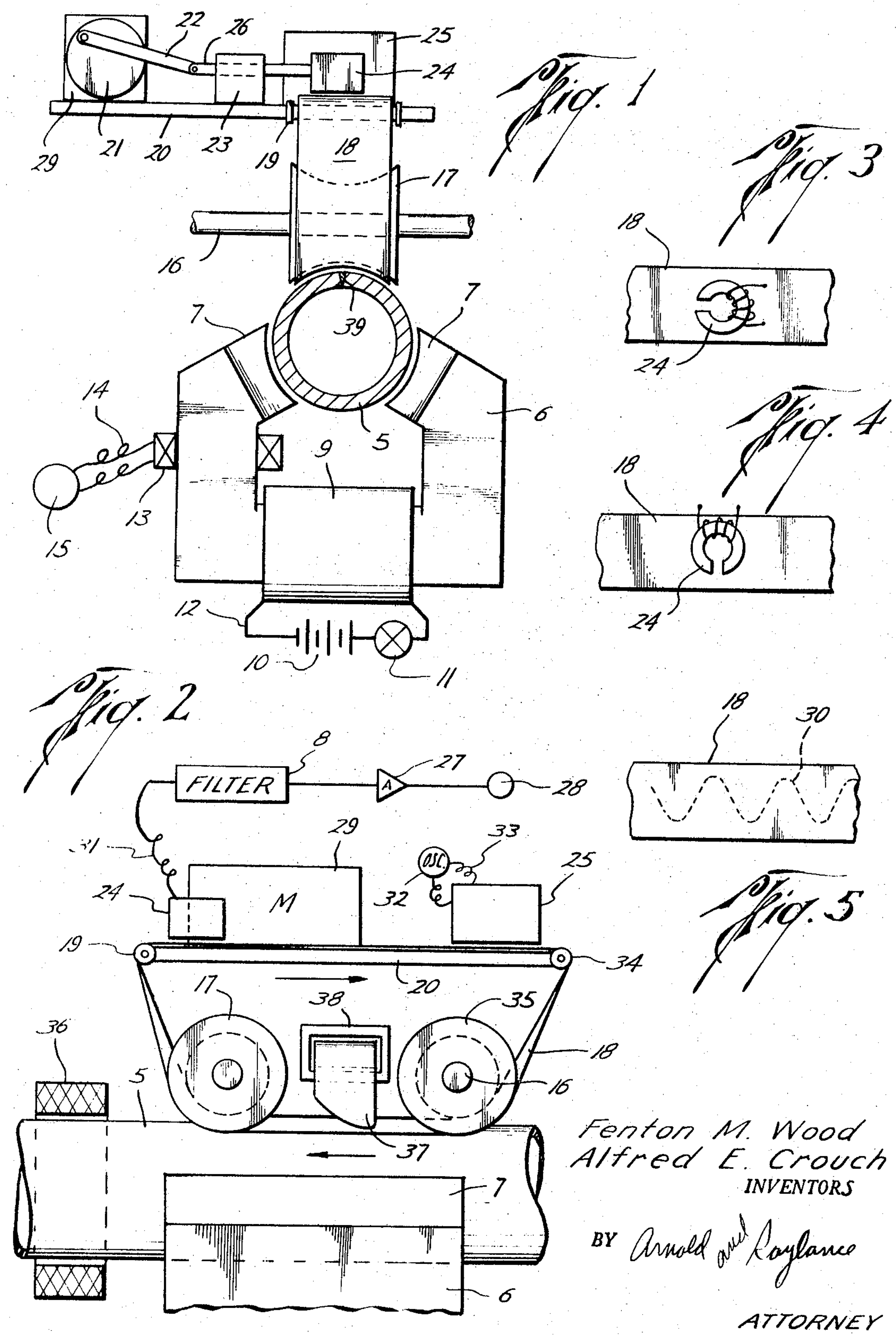
FIGURE 1 is an end elevation of an apparatus embodying the invention wherein the flux pattern is transferred to a magnetic tape.
FIGURE 2 is a side elevation of the device shown in FIGURE 1.

FIGURE 3 schematically illustrates the required orientation of the pick-up head with respect to the tape when longitudinal flaws are being sought.

FIGURE 4 schematically illustrates the required orientation of the pick-up head with respect to the tape when transverse flaws are being sought.

FIGURE 5 schematically illustrates the path of the reciprocating pick-up head with respect to the tape when the apparatus is employed for detection of longitudinal flaws.

Figures 6, 7:
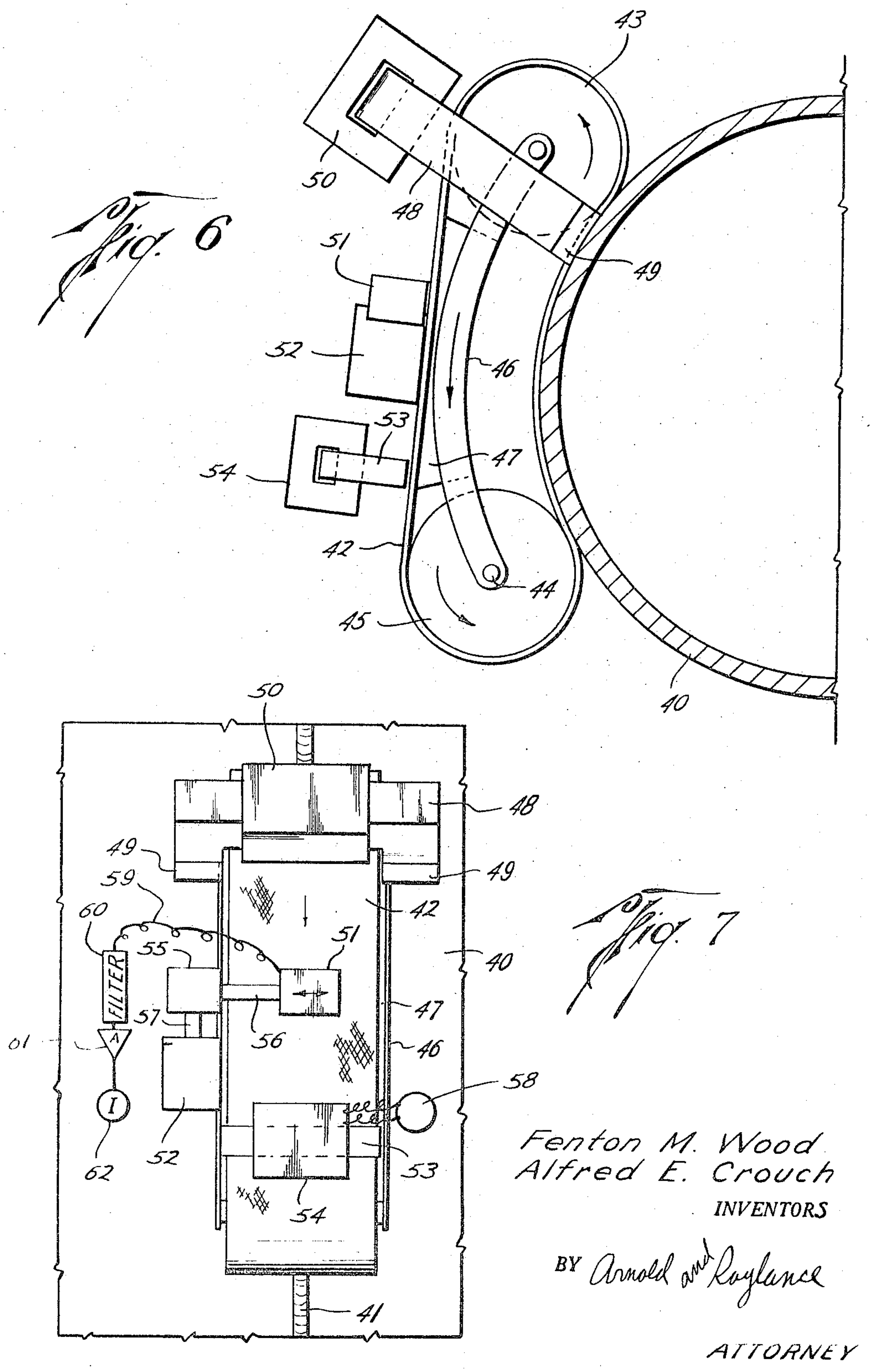

FIGURE 6 is a side view of a modification of the magnetic tape embodiment illustrated in FIGURE 1 which has been adapted to permit employment of the device for the inspection of arcuate surfaces.

FIGURE 7 is a top plan view of the device shown in FIGURE 6 to which has been added, schematically, a filter, amplifier and indicator.

Figures 8, 9:
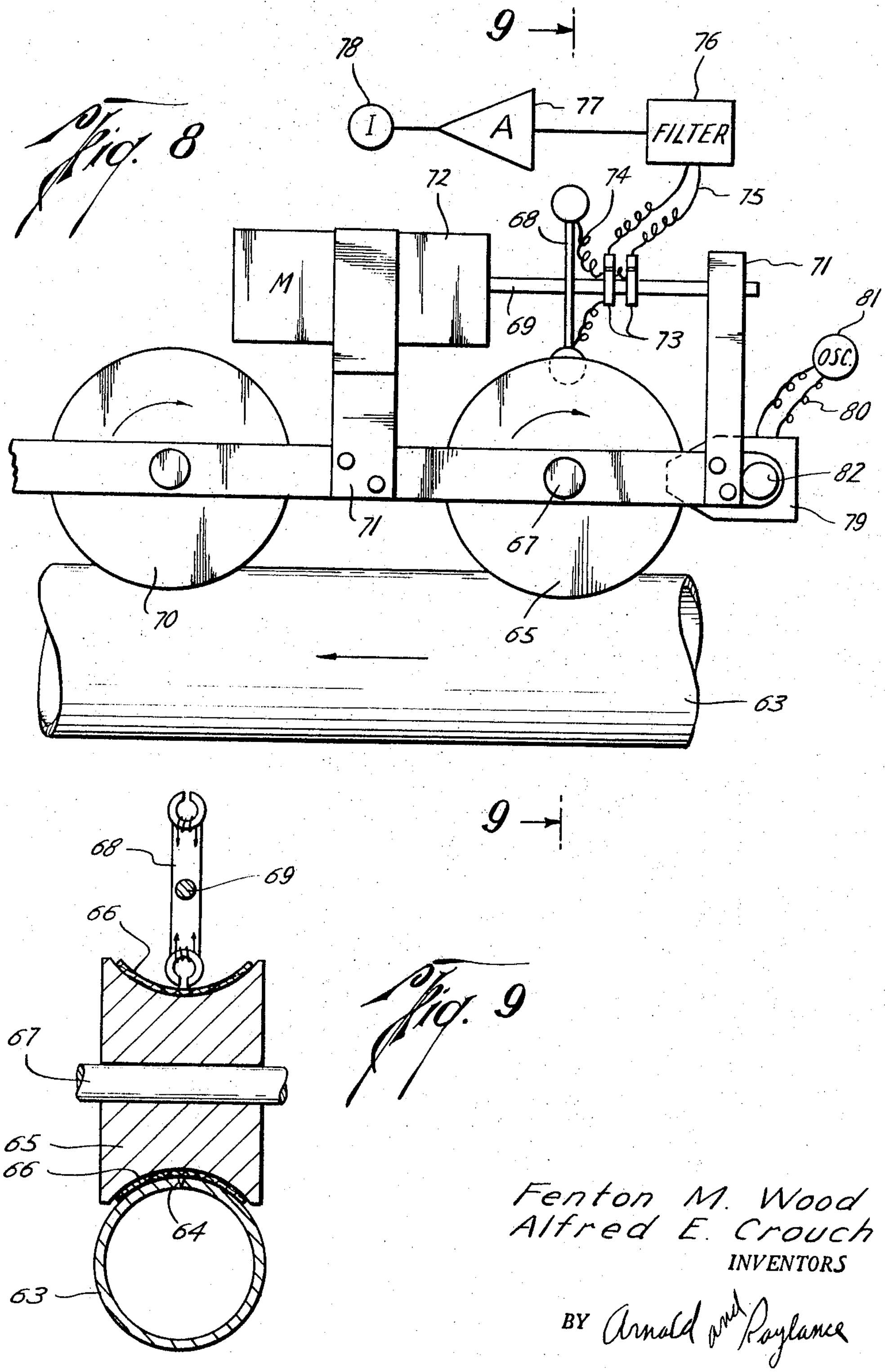

FIGURE 8 is a side elevation of an apparatus embodying the invention and wherein the flux pattern established on the member being tested is transferred to the magnetizable surface of a roller.

FIGURE 9 is a section taken along line 9—9 of FIGURE 8.

Figures 10, 11:
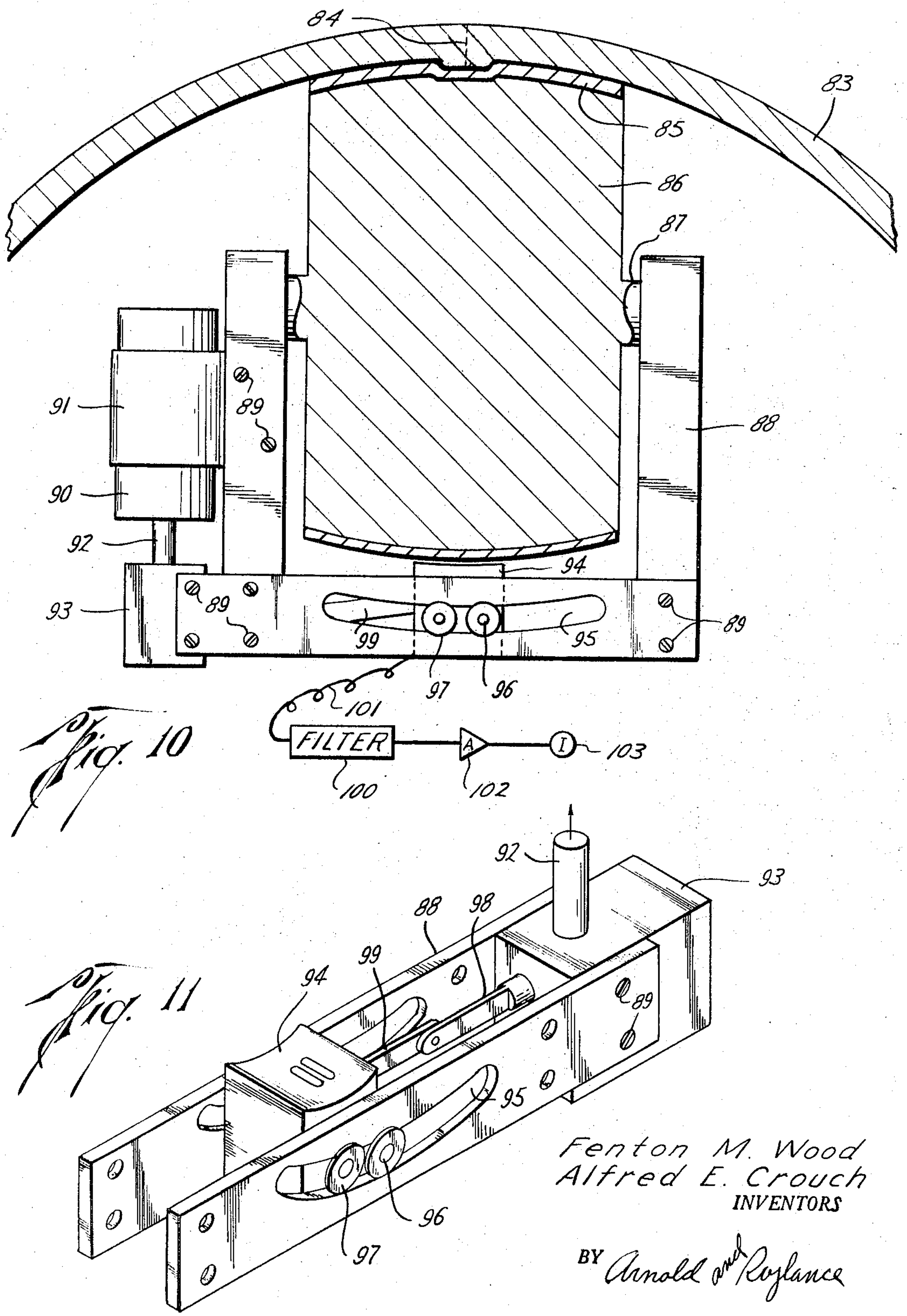

FIGURE 10 is an end view of a modification of the roller device shown in FIGURES 8 and 9 and in which the roller member and the pick-up head assembly have been adapted to permit inspection of concave surfaces.

FIGURE 11 is an isometric view of the pick-up head assembly shown in FIGURE 10.

In general, the present invention comprises the combination with apparatus for inducing a magnetic flux through and over the ferromagnetic member and carrying means for sensing and indicating the flux pattern thereby produced, of a pliable, somewhat elastic, magnetizable medium to which the flux pattern induced over the member being inspected can transfer a corresponding flux pattern, and an assembly adapted to carry this magnetizable medium whereby it may be progressively, conformingly laid over the member being tested.

By way of more particular description of the invention and to further facilitate an understanding thereof by those skilled in the art to which the invention pertains, the two specific embodiments thereof, which are illustrated in the accompanying drawings, are described in detail in the following portion of this specification.

With particular reference to FIGURES 1 through 5:

In one embodiment of this invention, inspection of weld line 39 of pipe 5 for longitudinal flaws is achieved by first inducing a unidirectional magnetic flux and a biasing flux over pipe 5 in the circumferential direction. This is conveniently accomplished by means of yoke 6 which is provided with pipe conforming pole pieces 7. To energize yoke 6, the base thereof carries a coil 9 which is connected to a unidirectional current source 10 by means of conductor 12 and switch 11, and one leg thereof carries a coil 13 which is driven by an oscillator 15 through conductors 14. Thus, yoke 6 serves as the vehicle for induction in pipe 5 of both a unidirectional magnetizing flux and a biasing flux.

With pipe 5 thus magnetized, a pliable magnetizable tape 18, carried by resilient pipe-conforming rollers 17 and 35 and cleaning rollers 19 and 34, carried in turn by base 20 and a conventional carriage frame (not shown) is progressively, conformingly laid over weld line 39. This is conveniently accomplished either by driving roller 35 through shaft 16 which may be connected to any convenient motive source, or by moving pipe 5 relative to roller 35.

When roller 35 is driven forward over weld line 39, tape 18 will pass thereunder, and because roller 35 is of arcuate transverse cross-section and is of resilient composition, tape 18 will be conformingly, progressively laid over the irregular contour of weld line 39 and the adjacent portions of pipe 5. As tape 18 is laid over weld line 39 a flux pattern will be induced thereon which corresponds to the pattern over pipe 5. Having "picked-up" this pattern, tape 18 then passes over roller 17 to roller 19. Upon reaching roller 19 the tape 18 is caused to flatten out and to turn a relatively sharp corner, thereby breaking away from most, if not all of the dirt and foreign matter, which may have been picked up from pipe 5. Tape 18 then passes under a pick-up head 24 oriented as shown in FIGURE 3 and driven back and forth over tape 18 by means of rod 26 carried by bushing 23 and driven by motor 29 through crank 21 and connector 22, to define a path 30 as shown schematically in FIGURE 5.

As tape 18 passes under pick-up head 24, the flux pattern on the tape induces a corresponding electrical signal in the pick-up head, which signal is conducted through filter 8 and amplifier 27 to indicator 28 by means of conductor 31. Tape 18 then passes under an erasing head 25 which is driven by an oscillator 32 through conductors 33, over roller 34 and back under roller 35 to repeat the cycle.

In the event it is desired to inspect weld line 39 for transverse flaws, yoke 6 is deenergized and a unidirectional magnetic flux is induced in pipe 5 in the longitudinal direction by means of coil 36. The AC biasing flux is induced by means of coil 38 and yoke 37 which is provided with tapered poles to effect a slow reduction in the field strength over several cycles of the biasing flux as the pipe 5 and the portion of the tape 18 adjacent thereto moves relative to the yoke 37 in the direction indicated by the lower arrow in FIGURE 2. The speed of motion of the pipe 5 and the portion of the tape 18 adjacent thereto is such that a selected point on the tape will traverse the distance under the portion of the yoke 37 closest to the tape and the portion of yoke 37 farthest from the tape within several cycles of the bias flux. Pick-up head 24 is then oriented as shown in FIGURE 4 and the above described procedure is followed.

Referring now to FIGURES 6 and 7:

To provide means embodying this invention and adapted to the inspection of arcuate surfaces, as for example girth weld, 41 of pipe 40, a magnetizable tape may be conveniently carried on a pair of resilient surface-conforming rollers 43 and 45. Rollers 43 and 45 are then mounted on a chassis 46 carried by a frame 47 and in turn by a carriage frame (not shown). In this embodiment, roller 45 is driven by means of shaft 44 driven in turn by any convenient motive means. Induction of a unidirectional magnetic flux over pipe 40 is conveniently achieved by means of yoke 48 and coil 50, and a biasing flux may be induced through one leg of yoke 48 in the manner above described.

Thus, as roller 45 is driven forward, tape 42 passes therearound to be progressively, conformingly laid over girth weld 41 and the adjacent portions of pipe 40. As tape 42 is laid over weld 41 it passes between poles 49 of yoke 48, picking up a flux pattern corresponding to that which is over pipe 40. Tape 42 then progresses around roller 42 to reciprocating pick-up head 51 driven by motor 52 through connectors 56 and 57 and kinematic converter 55, whereupon the voltage induced in pick-up head 51 generates a corresponding electrical signal which is transmitted through conductor 59 and filter 60 to amplifier 61 and indicator 62. Tape 42 then passes under yoke 53 of erasing coil 54 driven by oscillator 58 where the pattern is erased; so that the cycle can be repeated.

With reference to FIGURES 8 and 9:

In another embodiment of this invention magnetization of a pipe 63, for inspection of a weld line 64, is achieved with the above described apparatus. With pipe 63 thus magnetized, a resilient roller 65, having a pliable magnetizable pipe-engaging surface 66 and carrying a frame 71 which in turn carries an idler wheel 70, is set down on pipe 63 over weld line 64. Roller 65 which may be conveniently driven either by means of shaft 67 when it is connected to suitable motive means or by movement of pipe 63 relative to roller 65, is then driven over weld line 64. As roller 65 moves over weld line 64, its magnetizable pipe-engaging surface 66 is progressively laid down over weld line 64 and is urged into conforming engagement therewith.

As surface 66 thus engages weld line 64, a flux pattern corresponding to the flux pattern over weld line 64, is transferred to surface 66. Continued rotation of roller 65 then brings that portion of surface 66 on which the flux pattern has been induced under pickup heads 68 which are successively passed over surface 66 by the rotation of shaft 69 driven by motor 72. As surface 66 passes under pick-up heads 68 voltage is induced in the pick-up heads and an electrical signal is transmitted to filter 76 through slip rings 73 by means of conductors 74 and 75, which signal then passes through amplifier 77 to indicator 78.

Continuing past pick-up heads 68, surface 66 then passes under erasing coil 79 conveniently secured to frame 71 by means of pin 82 and operatively connected to oscillator 81 by means of conductors 80 where the flux pattern on surface 66 is erased before the cycle is repeated.

With reference to FIGURES 10 and 11:

A modification of the embodiment shown in FIGURES 8 and 9 is adapted to permit inspection over the concave face of an arcuate surface, as for example protruding weld line 84 of pipe 83. Thus, employing one of the above described magnetization assemblies and procedures, a magnetic flux is induced over pipe 83. Then, a resilient roller 86, having a pliable magnetizable pipe-engaging surface 85 is urged against weld line 84 by means of frame 88 which drivably carries roller 86 by means of shaft 87, frame 88 being carried by a conventional carriage (not shown and not forming a part of this invention).

As roller 86 moves over weld line 84 of magnetized pipe 83, a flux pattern is induced on surface 85 thereof. By continued movement of roller 86, surface 85 then passes over pick-up head 94 carried in guide slots 95 of frame 88 by means of pins 96 and retaining washers 97. To drive pick-up head 94 back and forth over surface 85 a motor 90 is secured to frame 88 by means of mount 91 and bolts 89, which motor is then operatively connected to pick-up head 94 through kinematic converter 93 by means of connectors 92, 98 and 99. Thus, as a magnetized portion of surface 85 passes pick-up head 94, voltage is induced therein and an electrical signal is transmitted to indicator 103 through filter 100 and amplifier 102 by means of conductor 101. Continuing past pick-up head 94, surface 85 then passes an erasing coil (not shown) to erase the pattern so that the cycle can be repeated.

In carrying out the present invention it is important that an active magnetizing field be employed. If one looks at some typical magnetization curves for a magnetizable tape, it will be noted that the linear, or "effective recording" zone, of each curve increases directly with bias. However, the slope of the curves, and hence the sensitivity represented thereby, falls off fairly rapidly as bias increases from 275 to 500 oersteds and beyond.

However, when in accordance with this invention A.C. bias is employed and the field strength is slowly reduced over several cycles, as by means of the tapered pole yoke illustrated herein, it is possible to obtain the ideal combination of increased linearity and increased sensitivity. In fact where the tapered pole yoke is utilized, ideal results may be obtained even with relatively low frequencies if the taper is lengthened correspondingly.

From the foregoing detailed description of several of the embodiments which the invention may take the importance of utilizing a pliable magnetizable medium in combination with a resilient body adapted to progressively and conformingly lay the medium over the surface to be inspected, is made clear. Thus, any pliable magnetizable medium or surface may be employed, as for example tape, wire or a roller or the like having a pliable magnetizable surface such as may be provided by coating, covering or other means.

However, the invention itself, by contrast with these or any of the other embodiments of which the invention may admit, is of much broader scope, and should not therefore, be limited to the details of any one or more particular embodiment.

What is claimed is:

1. In apparatus for testing ferromagnetic pipe for defects, the combination of a pliable magnetizable medium defining a continuous loop, a pair of rollers disposed against said medium within said loop to hold said medium against the pipe to be tested under each of said rollers simultaneously, said rollers and said magnetizable medium being capable of conforming to the contour of the surface of said pipe, flux means for inducing magnetic flux over at least a portion of the ferromagnetic pipe under said medium while said portion is under said medium, said rollers and said magnetizable medium being disposed with respect to said flux means to progressively conformingly lay portions of said medium over progressive portions of the ferromagnetic pipe during inducement of said magnetic flux in said pipe from said flux means and subsequently to progressively remove said portions of said medium therefrom so that a flux pattern corresponding to at least a portion of the flux pattern over the ferromagnetic pipe is transferred to said magnetizable medium, means for effecting relative movement between said medium and said pipe whereby said medium can progress over said pipe and accept a flux pattern indicative of defects in said pipe along a path thereon, means for converting said flux pattern transferred to said magnetizable medium into a corresponding electrical signal, means for indicating said signal, and means for erasing said transferred flux pattern from portions of said medium after said conversion thereof and before said portions are relaid over said pipe.

2. A method of detecting flaws in ferromagetic pipe, which comprises progressively inducing a unidirectional magnetic flux over progressive portions of a ferromagnetic pipe, progressively, conformingly laying progressive portions of a magnetizable medium over said progressive portions of the pipe while said flux is being progressively induced in said progressive portions of said pipe, and progressively removing said portions of said medium therefrom to transfer a flux pattern thereto corresponding to the flux pattern over the pipe, detecting said flux pattern in said medium, and converting said flux pattern to a corresponding indication of flaws.

3. The method of claim 2 wherein said progressive portions of a ferromagnetic pipe lie along a weld line of said pipe.

4. In apparatus for testing ferromagnetic pipe for defects, the combination of first flux means for inducing a unidirectional magnetic flux over at least a portion of the ferromagnetic pipe, second flux means for simultaneously inducing a biasing flux over said portion of the ferromagnetic pipe, a pliable magnetizable medium defining a continuous loop, a resilient member having a surface carrying said medium and arranged with respect to said first and second flux means to progressively conformingly lay portions of said medium over said portion of the ferromagnetic pipe during its receipt of said unidirectional and biasing fluxes from said first and second flux means and subsequently to progressively remove said portions therefrom so that a flux pattern corresponding to at least a portion of the flux pattern over the ferromagnetic member is transferred to said magnetizable medium, said resilient member and said magnetizable medium being capable of deforming to fit the contour of the surface of the ferromagnetic pipe portion, means for moving said resilient member over said pipe whereby said medium can progress over said pipe and accept a flux pattern indicative of defects in said pipe along a path thereon, means for converting said flux pattern transferred to said magnetizable medium into a corresponding electrical signal, means for recording said signal, and means for erasing said transferred flux pattern from portions of said medium after said conversion thereof and before said portions are relaid over the ferromagnetic member.

5. In apparatus for testing ferromagnetic pipe for defects, the combination of first flux means for inducing a unidirectional magnetic flux through at least at portion of the ferromagnetic pipe, second flux means for simultaneously inducing a biasing flux over said portion of the ferromagnetic pipe, a roller member having a resilient magnetizable surface arranged with respect to said first and second flux means for rolling contact with and to fit the configuration of said portion of the ferromagnetic member during its receipt of said unidirectional and biasing fluxes from said first and second flux means, thereby to transfer to said magnetizable surface a flux pattern corresponding to at least a portion of the flux pattern over the ferromagnetic pipe, means for rotating said roller member, means for converting the flux pattern transferred to said surface into a corresponding electrical signal, means for indicating said signal, and means for erasing said transferred flux pattern from said surface after said conversion thereof and before said surface is rearranged in rolling contact with the ferromagnetic pipe.

6. In apparatus for testing a ferromagnetic member for defects, the combination of first flux means for inducing a unidirectional magnetic flux over at least a portion of the ferromagnetic member, second flux means for simultaneously inducing an A.C. biasing flux over said portion of the ferromagnetic member such that the field strength of said biasing flux is slowly reduced along a length within said portion of the ferromagnetic member, a pliable magnetizable strip defining a continuous loop, roller members adapted to carry said pliable magnetizable strip and arranged with respect to said first and second flux means to progressively conformingly lay portions of said strip over said portion of the ferromagnetic member during its receipt of said unidirectional and biasing fluxes from said first and second flux means and subsequently to progressively remove said portions therefrom so that a flux pattern indicative of defects in said ferromagnetic member is transferred to said magnetizable strip, at least one of said roller members having a resilient strip engaging portion contoured to fit said portion of the ferromagnetic member, and at least one other of said roller members being of small diameter relative to said first mentioned roller member so that said small diameter roller member sharply bends said magnetizable strip, means for converting said flux pattern transferred to said magnetizable strip into a corresponding electrical signal, means for recording said signal, and means for erasing said flux pattern from said strip after said conversion thereof and before said portions are relaid over the ferromagnetic member.

7. In apparatus for testing a ferromagnetic member for defects, the combination of first flux means for inducing a unidirectional magnetic flux over at least a portion of the ferromagnetic member, second flux means for inducing an A.C. biasing flux over said portion of the ferromagnetic member such that the field strength of said biasing flux is slowly reduced along a length within said portion of the ferromagnetic member, a resilient magnetizable medium, means carrying said medium and arranged with respect to said first and second flux means to progressively lay portions of said medium over the ferromagnetic member during its receipt of said undirectional and biasing fluxes from said first and second flux means and subsequently to progressively remove said portions therefrom so that a flux pattern indicative of defects in said member is transferred to said magnetizable medium, means for converting said flux pattern transferred to said magnetizable medium into a corresponding electrical signal, and means for recording said signal.

8. In apparatus for testing a ferromagnetic member for defects, the combination of flux means for inducing a unidirectional magnetic flux over at least a portion of the ferromagnetic member, a pliable resilient magnetizable medium defining a continuous loop, means for carrying said medium and arranged with respect to said flux means to progressively conformingly lay portions of said medium over said ferromagnetic member during its receipt of said flux from said flux means and subsequently to progressively remove said portions therefrom so that a flux pattern indicative of defects in said member is transferred to said magnetizable medium, means for effecting relative movement between said medium and said member whereby said medium can progress over said member and accept a flux pattern indicative of defects in said member along a path thereon, means for converting said flux pattern transferred to said medium into a corresponding electrical signal, said means including a pick-up means disposed adjacent said loop, means for transversely moving said pick-up means across said medium to scan said medium for said flux pattern, means for recording said electrical signal, and means for erasing said flux pattern from said medium after said conversion thereof.

9. In apparatus for testing a ferromagnetic member for defects, the combination of flux means for inducing a unidirectional magnetic flux over at least a portion of the ferromagnetic member, a roller member arranged with respect to said flux means for rolling contact with said portion of the ferromagnetic member during its receipt of said unidirectional magnetic flux from said flux means, said roller member having a magnetizable surface for contact with the ferromagnetic member portion, said roller member and said surface thereof being resilient and shaped to conformingly and progressively overlay the ferromagnetic member portion and subsequently to progressively be removed therefrom, including deforming when raised portions are encountered, to transfer to said magnetizable roller surface the flux pattern at the surface of the ferromagnetic member portion, and means for converting said flux pattern transferred to said roller surface into a corresponding electrical signal.

10. In apparatus, as described in claim 9, wherein, said flux pattern converting means includes a pick-up coil adapted to transversely scan said pattern bearing surface so as to closely follow the contour of said roller member surface.

11. In apparatus for testing a ferromagnetic member for defects, the combination of flux means for inducing a unidirectional magnetic flux over at least a portion of the ferromagnetic member, a pliable magnetizable strip forming a continuous loop, roller members arranged to carry said loop and arranged with respect to said flux means to progressively and conformingly lay portions of said loop over said portion of the ferromagnetic member during its receipt of said magnetic flux from said flux means and subsequently to remove said portions therefrom so that a flux pattern is transferred to said magnetizable strip, at least one of said roller members having a strip engaging portion contoured to fit and press portions of said strip against said portion of the ferromagnetic member, and at least one other roller member having a small diameter relative to said strip engaging roller member disposed so that said loop forms a sharp corner about said small diameter roller member to cause dirt and other loosely clinging matter to depart from said loop, means disposed adjacent said loop for converting said flux pattern transferred to said portions of said loop into a corresponding electrical signal, and means for erasing said transferred flux pattern from said portions of said strip after conversion and before said portions are relaid over said ferromagnetic member.

12. Apparatus, as described in claim 11, wherein, said small diameter roller member is disposed so as to contact said loop between said strip engaging roller member at the point said portions of said loop are removed from the ferromagnetic member and said flux converting means, said roller members include another roller member cooperatively arranged to contact said loop between said flux converting means and the point said portions of said loop are relaid over the ferromagnetic member, said another roller member and said small diameter roller member each have a cylindrical shape, to return the medium to a flat plane after being shaped to overlay said ferromagnetic member portion, and said flux converting means includes a reciprocating pick-up coil that glides back and forth over said flat plane in said loop in transverse direction to scan the flux pattern.

13. The method of detecting flaws in a ferromagnetic member, which comprises inducing a unidirectional magnetic flux over at least a portion of the ferromagnetic member, simultaneously inducing an alternating biasing flux over said portion of the member, progressively, conformingly laying portions of a magnetizable medium over said portion of the member during its receipt of said unidirectional and biasing fluxes and progressively removing said portions therefrom to transfer a flux pattern thereto corresponding to the flux pattern over the member, detecting said flux pattern in said medium, and converting said flux pattern to a corresponding indication of flaws, the alternating biasing flux being induced such that its density decreases slowly in the magnetizable medium during a time of several periods of said alternating biasing flux while the unidirectional magnetic flux is being induced in the magnetizable medium.

14. The method of detecting flaws in a ferromagnetic member, which comprises inducing a unidirectional magnetic flux over at least a portion of the ferromagnetic member, progressively, conformingly laying portions of a magnetizable medium over said portion of the member during its receipt of said unidirectional flux and progressively removing said portions therefrom to transfer a flux pattern thereto corresponding to the flux pattern over the member, detecting said flux pattern in said medium, including the step of moving said medium in the direction of its longitudinal axis and passing a pick-up means over said medium transversely to the direction of movement of said medium, and converting said flux pattern to a corresponding indication of flaws.

No references cited.

ARCHIE R. BORCHELT, *Primary Examiner*.

R. J. CORCORAN, *Assistant Examiner*.